Aug. 17, 1965  C. S. BROWN, JR  3,201,138
LAMINATED SKI WITH A HONEYCOMB CORE
Filed Sept. 10, 1962
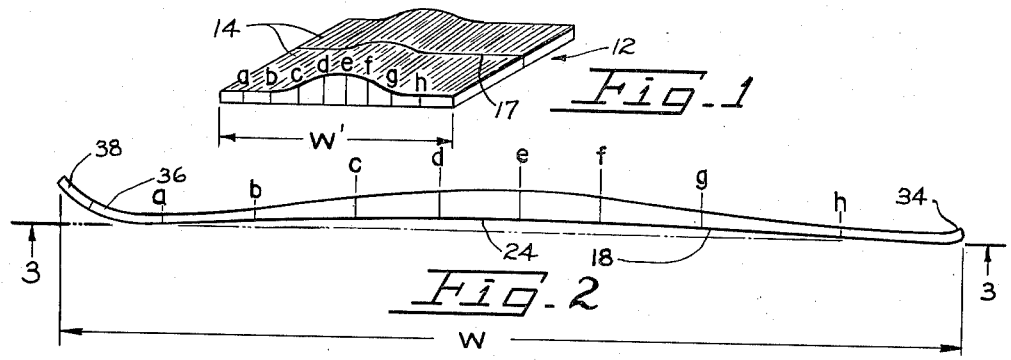
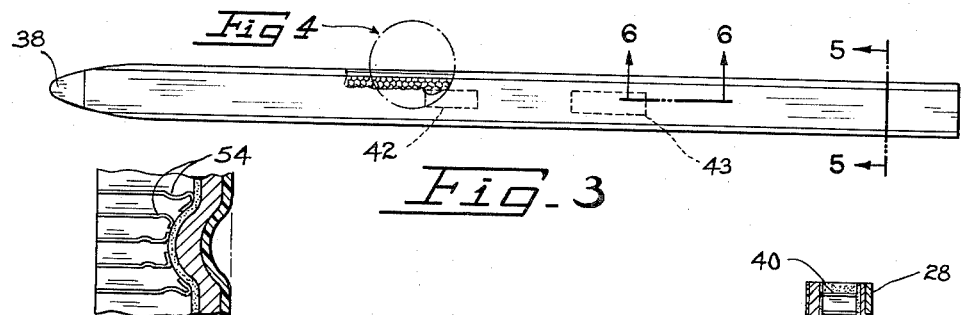
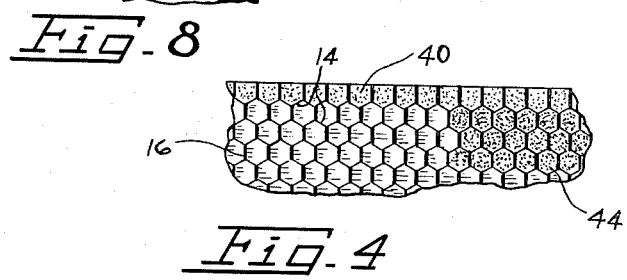
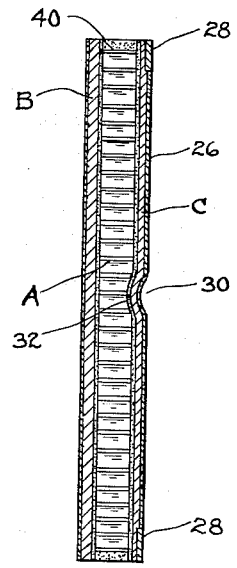
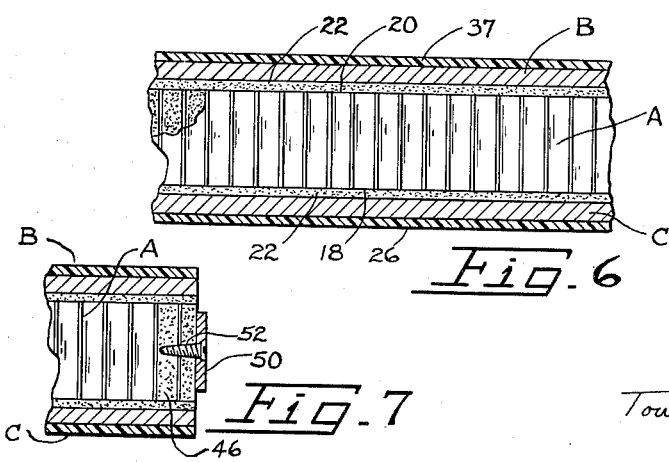
INVENTOR.
CULVER S. BROWN Jr.
BY
Townsend and Townsend
ATTORNEYS

3,201,138
LAMINATED SKI WITH A HONEYCOMB CORE
Culver S. Brown, Jr., 734 Melville Ave.,
Palo Alto, Calif.
Filed Sept. 10, 1962, Ser. No. 222,584
2 Claims. (Cl. 280—11.13)

This invention relates to an improved laminated ski with a cellular honeycomb core and a method for making such ski.

The present invention generally comprises a ski having a low density cellular honeycomb core that is formed with numerous ribbons bonded to one another on their oppositely facing surfaces at recurrent intervals. Top and bottom skins are affixed to the core by adhesive which securely affixes the skins to the edges of the core ribbons to form a laminated ski. The side walls are filled with grouting material which adheres to the rough side edges of the core to give the skin the appearance of being an integral structure.

A feature and advantage of this invention is that skis having various degrees of resiliency and flexibility can be constructed by either varying the material and density of the honeycomb core material or the flexibility of the material forming the skin. Fortunately, the art of using honeycomb as core material is sufficiently advanced so that the strength ratios of various sizes and shapes of cells and skin materials are well known and this body of knowledge can be incorporated into the present invention to provide skis with desired characteristics.

Another feature and advantage is that laminated skis in accordance with the method of this invention can be made rapidly and inexpensively with substantial quality control so that skis of desired characteristics can be repeatedly obtained. This feature and advantage exists because plural skis are made from a single block of unexpanded honeycomb which is contoured in one machining operation and later cut into strip to form individual skis. Thus, a pair of skis can be formed from the same block of honeycomb so that each ski of the pair has substantially identical characteristics.

Still another feature and advantage of the present invention is that skis of light weight and high strength are formed because only a minimum mass of core material is required.

Yet another feature and advantage of the present invention resides in the fact that skis of varying length can be formed from precut blocks of unexpanded honeycomb of the same size and contour by only varying the amount of expansion. This permits variation in the length of the ski without materially effecting the strength or contour of the ski. Manufacturing processes are thereby simplified.

A further feature and advantage is that the degree of flexure of the ski can be controlled by proper selection of the adhesive that secures the skins to the core. An elastic tape having adhesive compound on both surfaces is used to secure the skins to the core; the elasticity of the tape contributes to the resiliency of the ski. Thus, the improved ski can withstand greater amounts of distortion without failure than could most prior art skis.

Other objects, features, and advantages will be apparent from the following specification and attached drawings in which:

FIG. 1 is a perspective view of a piece of unexpanded honeycomb shaped to form a ski core upon expansion thereof;

FIG. 2 is a schematic elevational side view of a ski formed from expansion of the core of FIG. 1;

FIG. 3 is a bottom plan view of the ski taken substantially along line 3—3 of FIG. 2;

FIG. 4 is an enlarged view of a broken away portion of FIG. 3;

FIG. 5 is a cross sectional view of the ski taken substantially along line 5—5 of FIG. 3;

FIG. 6 is a cross sectional partial elevational view taken substantially along line 6—6 of FIG. 3;

FIG. 7 is an enlarged cross sectional view of a binding attachment on a side edge of a ski; and FIG. 8 is a modification of the bottom surface of a ski.

The ski of this invention if formed with a honeycomb cellular core A having an upper skin B and a lower skin C attached to the core by an adhesive.

Core A is formed by milling an unexpanded honeycomb block 12 to a predetermined contour which will form the required ski contour when the block is expanded. The honeycomb block includes a plurality of bonded together ribbons 14 formed of aluminum, paper, resin impregnated fibre, or the like. Ribbons 14 are bonded to one another at recurrent intervals to form nodes 16 as shown most clearly in FIG. 4, so that when the honeycomb block 12 is expanded, a matrix of substantially uniform cells is formed.

The contour on the top surface of honeycomb block 12 is determined by the contour of the ski to be ultimately produced. In the generalized case, the length of the unexpanded honeycomb is considered as $W'$, and the length of the completed ski is considered as $W$. The contour of the completed ski is known from the desired structural characteristics of the ski. Thus, the distances between various stations on the unexpanded honeycomb block 12, indicated by reference letters $a$–$h$ in FIG. 1, will be equal to $W'/W$ of the length between the same stations when the core is expanded. Unexpanded honeycomb block 12 is preferably wide enough to provide core material for at least two skis so that the skis after construction will have substantially identical characteristics.

Unexpanded honeycomb block 12 is now cut as at 17 into a plurality of pieces that can expanded to form a ski core. To form a ski, the block is expanded in accordance with conventional techniques, and when the block has been expanded, a core 18 (FIG. 2) is formed in which the stations $a$–$h$ are spaced from one another by an amount equal to $W/W'$ times the spacing between respective stations in unexpanded block 12. Application of skin layers to the top and bottom faces of core 18 forms a sandwich, and such honeycomb sandwich that has the outer skins generally normal to the ribbons is analogous to an I-beam with the skin layers corresponding to the flanges of the I-beam and the honeycomb core corresponding to the web. The skin layers carry axial compressive and tensile stresses; the core sustains shear stresses and prevents wrinkling or buckling of the skin layers under axial compressive loading.

Skins C and B are affixed to a lower face 18 and an upper face 20 of the core by a layer of adhesive 22 applied to the edges of ribbons 14. Adhesives which could be used for this purpose would include elastomers or epoxy resins. An adhesive tape having such an adhesive coating on a thin sheet of fiber glass which is available under the trademark designation of AF202 and made by the Minnesota Mining and Manufacturing Company has been found suitable for such use. Structurally AF202 tape is formed from a thin flexible sheet of flexible material having adhesive material on either side thereof. The tape is applied to the core and the skin is applied over the tape. When the adhesive cures, the core and skin are bonded. Such construction provides a resilient bond between the skin and core which permits slight relative movement therebetween when the ski flexes. As a consequence, the ski can be distorted by a greater amount without exceeding the elastic limit of the ski. Moreover, the degree of flexure of the ski can be controlled by proper selection of tape material.

Lower skin C which may be made of aluminum, steel, plastic or the like, is preformed with a cambered portion as at 24 intermediate the longitudinal ends thereof. Core A has sufficient flexibility to conform with the cambered surface when skin C is applied to the core. Thus, a ski is provided that, in accordance with conventional practice, distributes the skier's weight uniformly over the contact area between ski and snow. The exterior of each skin C and B is finished in the usual manner with a protective coating 26 and 37 of varnish, laquer, plastic, or the like. In the case of a snow ski, blades or hard edges 28 can be mounted on the ski edges to extend along the longitudinal edge of the bottom of the ski in the conventional manner.

Bottom skin C is formed with a flute or groove 30 substantially midway between and parallel with hard edges 28 and extending the length of the ski. Core 18 must be formed with a concavity 32 shaped to receive the interior convexity formed on bottom skin C by flute 30. The concavity can, of course, be formed by milling the unexpanded honeycomb piece 12, however, this is relatively costly. The characteristics of honeycomb are such that concavity 32 can be formed after the core is expanded by subjecting the central longitudinal area of bottom surface 18 to compressive forces from a suitably configured die. When cellular honeycomb is subjected to compressive forces directed against the edges of the cell forming ribbons, the ribbon portions in proximity to the compressive force exerting die yield or buckle as at 54. The remainder of the ribbon is not affected and therefore the strength of the honeycomb is not lessened significantly because only a small portion of the ribbons is distorted.

To attach conventional bindings to the ski, a forward mounting area 42 and a rear mounting area 43 are provided contiguous with top surface 20 of the skis. The mounting areas are formed by filling appropriately situated honeycomb cells with a filler material 44 (FIG. 4). Filler material 44 is preferably a plastic material that hardens sufficiently to permit formation of threads therein by drilling and tapping.

A performed upper skin B is attached to the top of core A by an adhesive layer 22 through which screws may be threaded into mounting areas 42 and 43 to effect attachment of suitable bindings to the ski. Upper skin B is preformed at the rear and forward longitudinal ends thereof with upturned portions 34 and 36 respectively and can be provided at the forward end with a tip 38 made of wood, aluminum, or the like.

The half cells at the edges of the core can be filled by grouting the edges with a plastic material 40; a ski with a smooth finished edge is thus obtained. Clamps for binding cables are conventionally mounted along the edge of the ski. A mounting bracket 50 for such guide (FIG. 7) is attached to the edge of the ski by means of an ordinary wood screw 52. In the cells abutting the mounting plate 50 plastic material 46 is provided which is of a type that hardens sufficiently to secure screw 52.

Construction of a ski according to the method of the present invention commences with milling an unexpanded block of honeycomb to a contour as in FIG. 1. In the specific example of my invention to which reference has been made above, the unexpanded block is approximately 2½ inches long ($W'=2½$ inches); milling operations on such block are straight forward. At least two pieces of equal width are cut from block 12 at 17. The honeycomb pieces are then equally expanded to form two substantially identical cores having cells of optimum shape (a regular hexagon) when the expanded length is 80 inches. It is to be borne in mind that the above dimensions depend upon the thickness of individual ribbons 14 and the length of ribbon bond nodes 16. The unexpanded pieces prepared as described next above can be under-expanded or over-expanded by approximately 10% or more without substantial affect upon the strength of the core so formed. Equal expansion of two pieces is necessary in order to manufacture a matched pair of skis. Thus, with one block of unexpanded core material 12 it is possible to form skis of the conventional lengths of 72 inches (6 feet) to 88 inches (7 feet 4 inches). In cutting the proper width of unexpanded honeycomb material from the premilled block along line 17, the final length of ski desired must be considered. This is because the honeycomb ski decreases in width as its length is expanded. Thus, because skis have substantially a constant width irrespective of the length of individual skis, the width of the honeycomb block core in the unexpanded condition must be altered according to the final length desired.

While one embodiment of my invention has been shown and described, it will be apparent that other adaptations and modifications may be made without departing from the spirit and the scope of the invention.

I claim:

1. An improved elongate ski, comprising a core of expanded honeycomb material, said honeycomb material including a plurality of flat ribbons bonded to one another at recurrent intervals to form a plurality of cells, said core forming top and bottom faces generally normal to the axis of said cells, each said ribbon of the core being disposed in an axis normal to the longitudinal axis of the ski, a top skin, means attaching said top skin to the top face of the core, a bottom skin, and means attaching said bottom skin to the bottom face of the core.

2. An improved elongate ski, comprising a core of expanded honeycomb material, said honeycomb material including a plurality of flat ribbons bonded to one another at recurrent intervals to form a plurality of cells, said core forming top and bottom faces generally normal to the axis of said cells, each said ribbon of the core being disposed in an axis normal to the longitudinal axis of the ski, a top skin, a flexible adhesive layer attaching said top skin to the top face of the core, a bottom skin, and a flexible adhesive layer attaching said bottom skin to the bottom face of the core.

References Cited by the Examiner

UNITED STATES PATENTS

| 2,245,319 | 6/41 | Beerli | 280—11.13 |
| 2,428,979 | 10/47 | May | 156—197 |
| 2,694,580 | 11/54 | Head | 280—11.13 |
| 2,851,277 | 9/58 | Holmberg et al. | 280—11.13 |
| 2,928,456 | 3/60 | Potchen et al. | 280—11.13 |
| 2,952,579 | 9/60 | Merriman | 156—197 X |
| 3,007,834 | 11/61 | Moeller et al. | 156—197 |
| 3,067,507 | 12/62 | Titus. | |

FOREIGN PATENTS 215,868   6/61   Austria.

A. HARRY LEVY, *Primary Examiner.*